US008775577B1

(12) United States Patent
Alford et al.

(10) Patent No.: US 8,775,577 B1
(45) Date of Patent: Jul. 8, 2014

(54) SYSTEM AND METHOD FOR CONFIGURATION MANAGEMENT SERVICE

(75) Inventors: William J. Alford, Seattle, WA (US); Sumit Lohia, Seattle, WA (US); Thomas William Whitcomb, Seattle, WA (US); Kenneth L. Hamer, Seattle, WA (US); Evan Michael McLain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 809 days.

(21) Appl. No.: 11/958,844

(22) Filed: Dec. 18, 2007

(51) Int. Cl.
*G06F 15/177* (2006.01)

(52) U.S. Cl.
USPC ............................ 709/221; 717/171; 717/176

(58) Field of Classification Search
USPC ........................ 709/203, 217, 219–223, 226; 340/4.3–4.33; 710/104; 713/1–2, 100; 718/1, 104; 717/168–178; 712/15; 370/254
See application file for complete search history.

(56) References Cited

U.S. PATENT DOCUMENTS

| 5,752,042 | A | 5/1998 | Cole et al. |
| 5,999,740 | A | 12/1999 | Rowley |
| 6,725,453 | B1 * | 4/2004 | Lucas et al. ................... 717/178 |
| 6,766,364 | B2 * | 7/2004 | Moyer et al. .................. 709/221 |
| 7,082,465 | B1 * | 7/2006 | Martin et al. .................. 709/224 |
| 7,290,257 | B2 | 10/2007 | Henig et al. |
| 7,418,484 | B2 * | 8/2008 | Presley .......................... 709/220 |
| 7,526,479 | B2 * | 4/2009 | Zenz .................................... 1/1 |
| 7,533,163 | B1 * | 5/2009 | Zenz et al. ..................... 709/220 |
| 7,577,722 | B1 * | 8/2009 | Khandekar et al. ............ 709/220 |
| 7,831,734 | B2 * | 11/2010 | Bernhard et al. .............. 709/248 |
| 8,316,123 | B2 * | 11/2012 | Sethuraman et al. ......... 709/224 |
| 2002/0114453 | A1 * | 8/2002 | Bartholet et al. ................ 380/44 |
| 2002/0198967 | A1 * | 12/2002 | Iwanojko et al. ............. 709/220 |
| 2004/0177352 | A1 * | 9/2004 | Narayanaswamy et al. .. 717/169 |
| 2004/0230971 | A1 * | 11/2004 | Rachman et al. ............. 717/175 |
| 2005/0256864 | A1 * | 11/2005 | Semerdzhiev .................... 707/5 |
| 2005/0289538 | A1 * | 12/2005 | Black-Ziegelbein et al. . 717/177 |
| 2006/0140385 | A1 * | 6/2006 | Haase et al. ............. 379/221.09 |
| 2006/0161909 | A1 * | 7/2006 | Pandey et al. ................. 717/168 |

(Continued)

OTHER PUBLICATIONS

Gucer et al. "Deployment Guide Series: IBM Tivoli Provisioning Manager Express V4.1 for Software Distribution" [Online], First Edition May 2006 [Retrieved on: Jul. 30, 2013], IBM Redbooks [www.redbooks.ibm.com], [Retrieved from: http://www.redbooks.ibm.com/redbooks/pdfs/sg247236.pdf ].*

*Primary Examiner* — Saleh Najjar
*Assistant Examiner* — Eric W Shepperd
(74) *Attorney, Agent, or Firm* — Robert C. Kowert; Meyertons, Hood, Kivlin, Kowert & Goetzel, P.C.

(57) ABSTRACT

System and method for agentless computing system configuration management in networked environments. A configuration management service may be implemented as a service on a network with a standard network interface. A client may communicate with the service to specify a configuration for a target system, for example through a browser interface. The specified configuration may be stored by the service. The service may generate a package according to the specified configuration. The package may be delivered to the target system via the network. The package may then install the configuration, for example, one or more software, data, or other digital components, on the target systems in accordance with the specified configuration. The clients may request that the service verify and/or update the installed configuration on the target system. The service may, in response, generate an update package for the installed configuration. Target systems may include computer systems and virtual machines.

24 Claims, 10 Drawing Sheets

(56) References Cited

U.S. PATENT DOCUMENTS

| | | |
|---|---|---|
| 2006/0218246 A1 | 9/2006 | Fawcett |
| 2006/0230407 A1* | 10/2006 | Rosu et al. .................... 718/105 |
| 2006/0259904 A1* | 11/2006 | Celli et al. .................... 717/174 |
| 2006/0282516 A1* | 12/2006 | Taylor et al. ................. 709/220 |
| 2007/0011328 A1* | 1/2007 | Srinivasan ................... 709/226 |
| 2007/0011494 A1* | 1/2007 | Xie et al. ....................... 714/38 |
| 2007/0186212 A1* | 8/2007 | Mazzaferri et al. ............... 718/1 |
| 2007/0226302 A1* | 9/2007 | Provo ........................... 709/206 |
| 2007/0233698 A1* | 10/2007 | Sundar et al. ................... 707/10 |
| 2007/0234302 A1* | 10/2007 | Suzuki et al. ................. 717/126 |
| 2008/0046708 A1* | 2/2008 | Fitzgerald et al. ................ 713/2 |
| 2008/0163194 A1* | 7/2008 | Dias et al. .................... 717/174 |
| 2008/0295064 A1* | 11/2008 | Mitra et al. ................... 717/100 |
| 2009/0055822 A1* | 2/2009 | Tolman et al. .................... 718/1 |
| 2009/0133014 A1* | 5/2009 | Laurila et al. ................. 717/174 |
| 2009/0144729 A1* | 6/2009 | Guizar ........................... 717/176 |
| 2010/0235476 A1* | 9/2010 | Lin et al. ...................... 709/219 |

* cited by examiner

SYSTEM AND METHOD FOR CONFIGURATION MANAGEMENT SERVICE

BACKGROUND

The Internet, sometimes called simply "the Net," is a worldwide system of computer networks in which a client at any one computer may, with permission, obtain information from any other computer. The most widely used part of the Internet is the World Wide web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Configuration Management Systems

Various configuration management systems for managing configurations (e.g., installations of application environments) on computing systems over a network exist. These systems tend to be directed at specific vendors' applications or suites of products, and specific to particular hardware and/or software platforms. Furthermore, these systems tend to rely on agents or daemons that reside on the computing systems and perform management (e.g., verification) tasks in the background. Administrators tend to be wary of agents and daemons that run on their systems to perform various tasks for the most part outside of their control or knowledge. In addition, agents and daemons typically communicate with applications running remotely on some server or servers over the network. Such communications between an agent or daemon on a client system and a remote server may be difficult or impossible from client systems behind firewalls or Network Address Translation (NAT) servers.

Web Services

Generally speaking, a web service interface may be configured to provide a standard, cross-platform API (Application Programming Interface) for communication between a client requesting some service to be performed and the service provider. In some embodiments, a web service interface may be configured to support the exchange of documents or messages including information describing the service request and response to that request. Such documents, or messages, may be exchanged using standardized web protocols, such as the Hypertext Transfer Protocol (HTTP), for example, and may be formatted in a platform-independent data format, such as eXtensible Markup Language (XML), for example.

Figure 1:
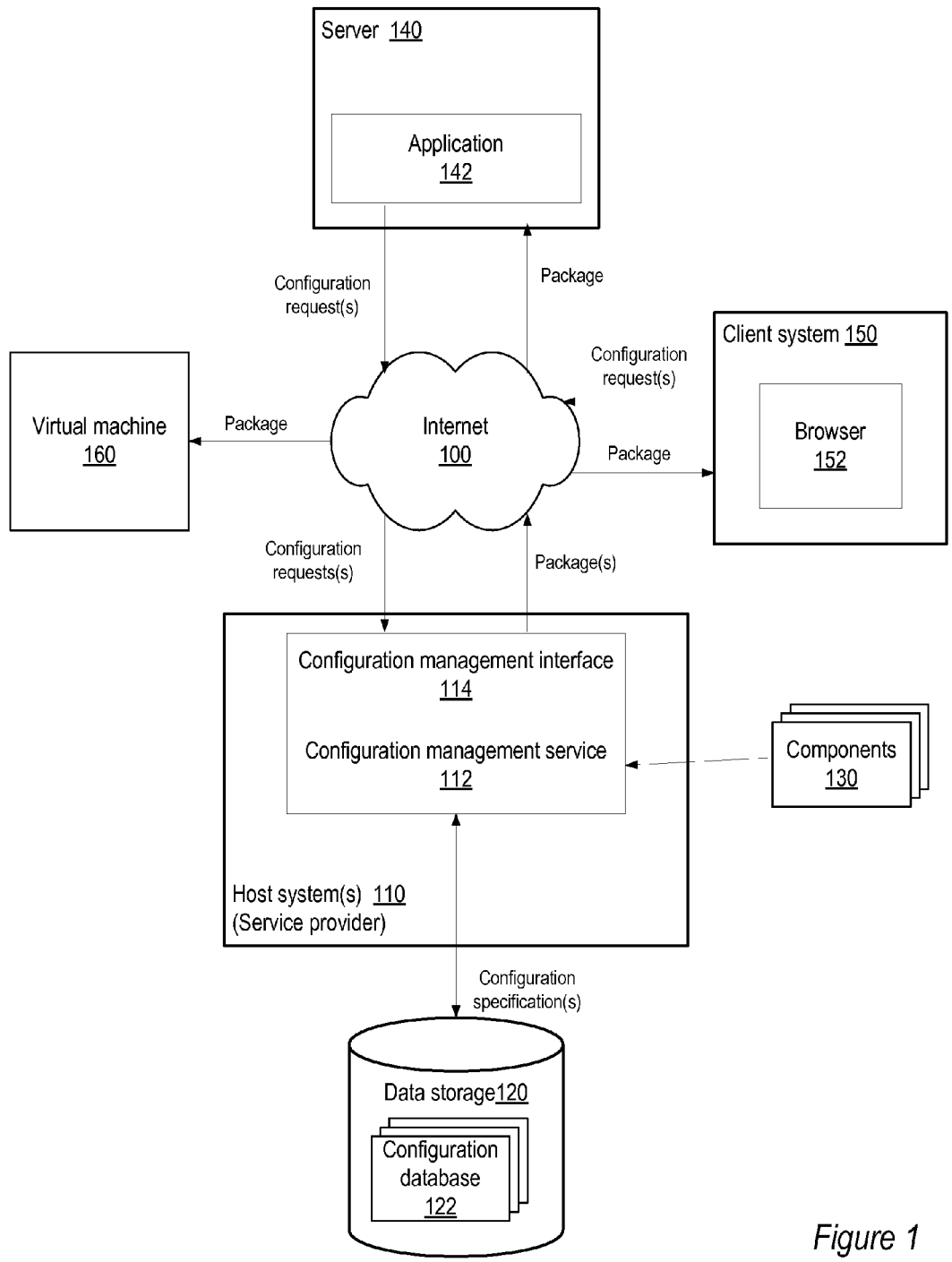
FIG. 1 illustrates a configuration management service implemented as a web service in a networked environment according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for the configuration management of software and other digital components of computing systems in networked environments are described. Embodiments may provide a generic, agentless configuration management service for installing and managing configurations of various content on potentially heterogeneous target systems. Embodiments may be used to manage configurations of target systems independent of specific hardware and/or software platforms. The configuration management service may be accessed by clients of the service to specify desired configurations of various content, for example software, application environments, data, other digital components, or combinations thereof, to be installed or updated on specified target systems. For example, a desired configuration may be a particular application environment, and the content may be the software and data files for implementing the particular application environment on a specified target system. The configuration management service may be accessed by a client to request that a particular configuration, e.g. a particular application environment, be installed on two or more different target system platforms. For example, a client may specify that a particular word processing application is to be installed on two different hardware platforms, one of which uses a 32-bit processor and the other a 64-bit processor. The configuration management service may deliver a package to the first platform that may include components for implementing a configuration (e.g., an application environment) according to the first platform's particular requirements, and may deliver a different package to the second platform that may include one or more different components for implementing the same configuration (e.g., application environment) according to the second platform's particular requirements. The configuration management service may also be accessed by a client to specify different configurations for two or more similar or different target systems.

Embodiments of the configuration management service may allow the abstraction of particular configurations across heterogeneous target systems. The configuration management service may be used to specify a particular logical configuration to be installed across a collection of heterogeneous target systems that may include target systems with different hardware platforms and that may include physical and virtual systems.

The target system may be a computer system or a virtual machine implemented on one or more computer systems. A client may also specify communications information for the specified target system(s) to the configuration management service—e.g. a specific program on the target system(s) with which the configuration management service is to communicate, network addresses, protocols to be used, security requirements, times, and so on. The communications information indicates how the configuration management service is to communicate with the target system(s). The configuration management service may provide a generic configuration management service in that it is not specific to or limited to any particular client, content, configuration, or target system.

In one embodiment, the configuration management service may be implemented as a service on a network with a standard network interface. In one embodiment, the configuration management service may be implemented as a web service with a web service interface. In embodiments, a client may communicate with the configuration management service to specify configurations and communications information programmatically, through a browser interface, or via other mechanisms that are capable of initiating service requests over a network, e.g. the Internet, in accordance with the interface to the configuration management service. The specified configurations and communications information may be stored by the configuration management service, for example in a database on back-end storage. The configuration management service may generate digital packages according to the specified configurations. The generated packages may be delivered to the target computer systems via the network according to the specified communications information. The delivered packages may then install the content, for example, one or more software, data, or other digital components, on the target computer systems in accordance with the specified configurations, and may perform other necessary or desired actions on the target systems to install the specified configuration.

Embodiments may provide one or more mechanisms whereby clients may request that the configuration management service verify and/or update previously installed configurations of indicated systems. When a client generates and sends a request to verify or update the configuration on a system, the configuration management service may access the stored configurations to verify that the configuration of the content on the system matches the stored configuration specification. If the configuration management service determines that the configuration of the system is not in accordance with the stored configuration specification, for example if a component specified by the stored configuration has been deleted from the system, the configuration management service may automatically generate an update package and send the package to the system to update or otherwise correct the configuration on the system. Alternatively, the configuration management service may notify the client, and the client may, if desired, request that the configuration management service update or otherwise correct the configuration on the system, for example by generating and sending an update package. The client may also specify communications information that indicates how the configuration management service is to communicate with the target system(s).

Embodiments may be "agentless"; that is, embodiments may not install or rely upon an agent or daemon that resides on the target systems and runs in the background or executes on a periodic or aperiodic schedule to verify and manage the configuration on the target systems. Instead, the client may control the requesting of configuration installations and verifications and the specification of how to communicate with target systems to the configuration management service via the interface to the configuration management service using service requests or messages as necessary or desired. For example, a client may request installation or verification via a browser that generates service requests to the interface of the configuration management service in accordance with the client's input. Client input may include, but is not limited to, one or more of identification of target system(s), configuration specifications, and communications information for the target systems. As another example, a client (or a third party) may generate a program, script, etc. that may be used to periodically or aperiodically generate web service requests, e.g. requests to verify a configuration on a particular target system, in accordance to the interface to the configuration management service.

Packages may include various combinations of components which may include, but are not limited to, installers, applications, programs, software modules, drivers, data files, image files, scripts, plug-ins, references to external resources which may be accessed by the target systems, or any other type of digital component that may be necessary or desired for installation on a target system. The configuration management service may construct a package from components obtained or generated locally and/or from components obtained from remote locations, e.g. from other servers or locations on an intranet or on the internet. Components may be provided by the service provider or may be obtained from one or more third parties. In one embodiment, the contents of the package may be compressed for transmission over the network. In one embodiment, the package may be encrypted for secure transmission over a public network, for example using private key/public key encryption.

The target systems to which packages may be delivered may include both computer devices and virtual machines. Target computer devices may include, but are not limited to, mainframes, server systems, desktop computers, personal computers, handheld or portable computing devices such as Personal Digital Assistants (PDAs), and so on. In general, target systems may include any computer device that is capable of network communications. Packages may be delivered via the network to the local storage of any such system and installed thereon.

A virtual machine (VM) may be defined as a computing environment which is created within or on top of another environment (e.g., a single virtual machine may be created across numerous computer systems or on a single computer system). The computing environment that a virtual machine runs within may be referred to as a "host." One host environment may run one VM or multiple VMs. Because VMs are separated from the physical resources they use, the host environment may be able to dynamically assign those resources among them. An exemplary virtual machine environment to which packages may be delivered may be implemented on a network via a network-based virtual machine service that provides resizable compute and/or storage capacity across one or more computer systems on the network to users as a "virtual machine." The service may allow users to create and manage custom virtual machine environments across one or more computer systems on the network. The service may provide interfaces for a user to, for example, requisition computer systems or portions of systems for use in a virtual machine, release computer systems from use, load the created virtual machine with data and/or applications and manage the loaded data and/or applications, manage network access permissions to the user's virtual machine, and run an image created on the user's virtual machine using as many or few systems as desired.

Packages may be delivered to a single target system, for example through a direct communications link between the configuration management service and the target system. The target system may be, but is not necessarily, the system from which the configuration was specified to the configuration management service by the client. Alternatively, a package generated according to a configuration specified by a client may be delivered to two or more specified target systems. In one embodiment, communications information as specified by the client may be used by the configuration management service to communicate with the target system. In one embodiment, bit torrent may be used to deliver packages to target systems. In bit torrent, a .torrent file may be generated that acts as a bit torrent feed; if the client has specified multiple target systems, the target systems may all be directed to that bit torrent to receive the package. Other methods of delivering packages to one or more target systems are possible and contemplated. The communication of packages from the configuration management service to the target systems may be secured, for example using private key/public key encryption or other means of securing communications over a public network. In one embodiment, the security to be used to communicate with a target system may be specified by the client.

Target systems may be heterogeneous and are not limited to any particular manufacturer, hardware set, operating system, computing environment, programming language, virtual machine implementation, and so on. In other words, embodiments may be used to generate and deliver packages of generic components for installation on generic target systems and for updates to installed configurations on target systems. Embodiments may be used to generate and deliver packages for installing a particular configuration, e.g. a particular application environment, on two or more different target system platforms. For example, a client may specify that a particular word processing application is to be installed on two different hardware platforms, one of which uses a 32-bit processor and the other a 64-bit processor.

In embodiments of the configuration management service implemented as a web service, documents, or messages, may be exchanged between client systems and the configuration management service using standardized web protocols, such as the Hypertext Transfer Protocol (HTTP), for example, and may be formatted in a platform-independent data format, such as eXtensible Markup Language (XML). Using a standardized web protocol such as HTTP allows configuration management to be performed through firewalls and NATs.

In one embodiment, the configuration management service may be implemented as a service on a network with a standard network interface that may use standardized protocols (e.g., HTTP) for communicating over the network (e.g., Internet). In one embodiment, the configuration management service may be implemented as a web service with a web service interface that may use standardized protocols (e.g., HTTP) for communicating over the network (e.g., Internet). In one embodiment, the interface to the configuration management service may be published as an open Application Programming Interface (API) that allows developers to program client-side applications, modules, web pages, or even other services in accordance with the interface to the configuration management service. For example, a developer may generate a web page for presentation via a browser to clients that allows the clients to specify particular configurations and communications information as necessary or desired, and that leverages the interface to the configuration management service to send configuration requests specifying the particular configurations to the configuration management service via the Internet. As another example, a developer may program a client-side application to communicate with the configuration management service in accordance with the published interface to the configuration management service.

Figure 8:
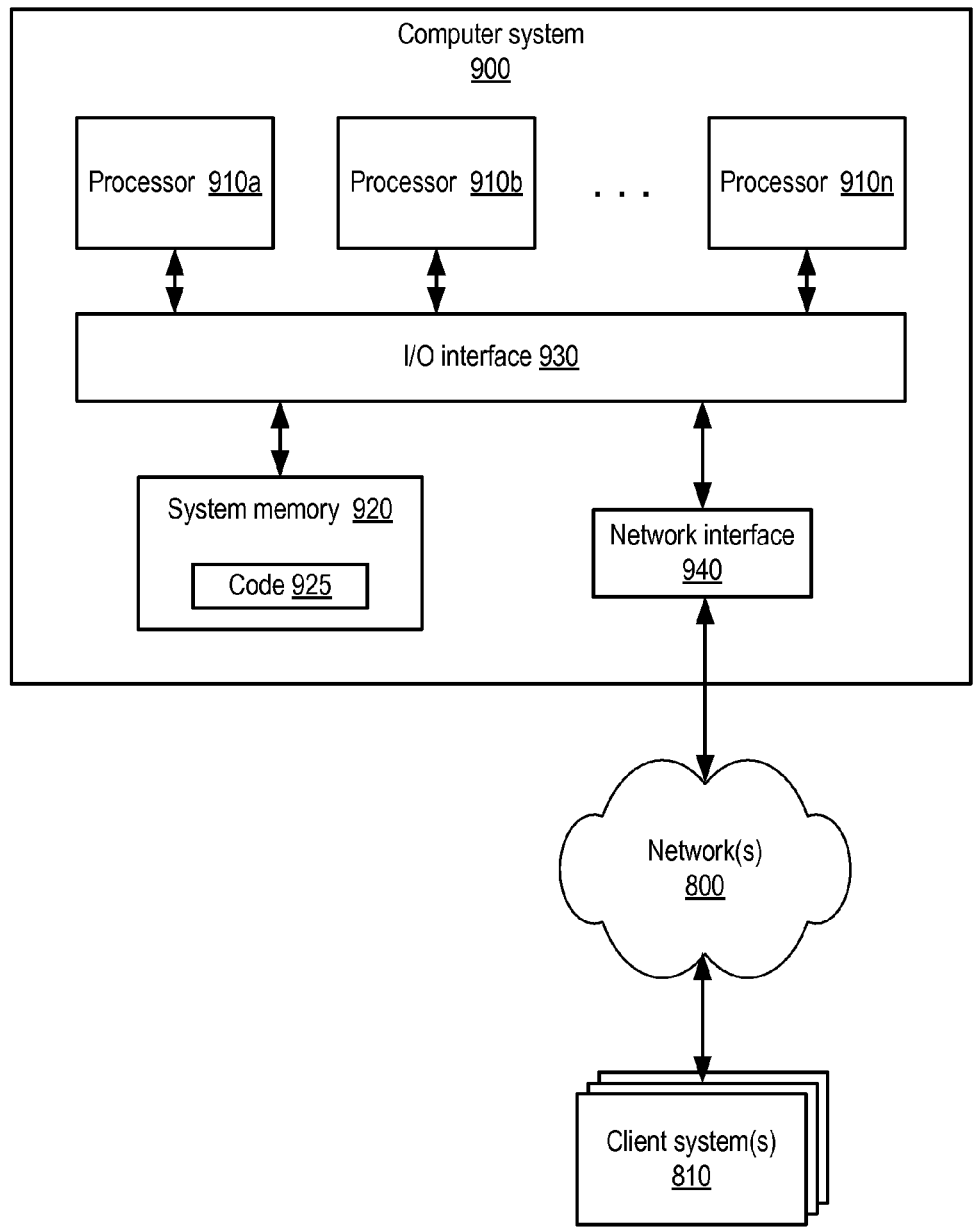
FIG. 8 is a block diagram illustrating an exemplary embodiment of a computer system.

FIG. 1 illustrates a configuration management service implemented as a web service in a networked environment according to one embodiment. One or more host systems 110 may host an instance of a configuration management service 112. An exemplary computer system which may host an instance of a configuration management service 112 is illustrated in FIG. 8. Functions of the configuration management service 112 may be accessible to clients on Internet 100 through a configuration management interface 114 to the configuration management service 112. The configuration management interface 114 may be a standard network interface. In one embodiment, configuration management interface may be implemented as a web service interface.

Clients may determine desired or necessary configurations for various target systems. FIG. 1 illustrates a server 140, a client device 150, and a virtual machine 160 as target systems. The target systems to which packages may be delivered may include computer devices and virtual machines. In general, target computer devices may include any computer device that is capable of network communications. Packages may be delivered via the network to the local storage of any such system and installed thereon. An exemplary virtual machine environment to which packages may be delivered may be implemented on a network via a network-based virtual machine service that provides resizable compute and/or storage capacity across one or more computer systems on the network to users as a "virtual machine." Embodiments may be used to deliver packages to other virtual machine environments. A client may define a configuration to specify a virtual machine implementation within such a virtual machine environment.

Configuration management system 112 may be a generic configuration management system configured to build and deliver different packages for installing a variety of different, heterogeneous configurations to heterogeneous target systems. That is, the configurations may be for a variety of different applications, software systems, and so on, and the target systems may be of different types, makes, and models, may include different hardware and/or software architectures or environments, and may run different operating systems, storage systems, applications or combinations of applications, application suites such as word processing suites, and so on. As previously noted, a target system may be implemented as a computing device or as a virtual machine. Configuration management system 112 may be configured to build and deliver packages for installing a particular configuration, e.g. a particular application environment, on two or more different target system platforms.

Configuration management system 112 may be generic and not limited in regards to the types of configurations on target systems that clients may request from configuration management system 112. For each received configuration request, the configuration management service 112 may build a specific package including one or more particular components 130 for implementing the particular configuration indicated by the configuration request on the particular target system. For example, one package delivered to server 140 may include one or more components for implementing a requested office application suite, another package delivered to client system 150 may include one or more components for implementing a game or game system. Components included in a package may be provided by the service provider and/or by one or more third parties. The components may be obtained locally or from remote locations, e.g. from other servers or locations on an intranet or on the internet.

As an example, a client may use application 142 on server 140 to specify a configuration to be installed on server 140 or on some other target system or systems, such as on virtual machine 160. The client may also specify communications information for the specified target system(s)—e.g. a specific program on the target system with which the configuration management service 112 is to communicate, network addresses, protocols to be used, security requirements, times, and so on. Application 142 may allow the client to specify or select a desired configuration, and may provide a communications interface to generate and send the configuration request to configuration management service 112 in one or more messages in accordance with configuration management interface 114. As another example, a client may use a browser 152 on client system 150 to specify a configuration to be installed on client system 150 or on some other target system or systems, such as on virtual machine 160. The client may also specify communications information for the specified target system(s). Browser 152 may present a web page or pages that may allow the client to specify or select a desired configuration. Browser 152 generates and sends the configuration request to configuration management service 112 in one or more messages in accordance with configuration management interface 114.

In one embodiment, a configuration request may include a client identifier that uniquely identifies the client that originated the request. A configuration request may include other information, such as information describing the hardware and/or software computing environment of one or more target systems on which the requested configuration is to be installed and communications information for the specified target system(s). Upon receiving a configuration request, configuration management service 112 may collect one or more components 130 necessary for the configuration and compile the components 130 into a package. Components 130 may include, but are not limited to, installers, applications, programs, software modules, drivers, data files, image files, scripts, plug-ins, or any other type of digital component that may be necessary or desired for installation on the target system. Information provided in the configuration request may be used by configuration management service 112 to determine particular components for inclusion in the package for particular target systems. Components included in a package may be provided by the service provider and/or by one or more third parties. The components may be obtained locally or from remote locations, e.g. from other servers or locations on an intranet or on the internet. An example of an intranet may be a Local Area Network (LAN) of a company or company site. The package may then be delivered via the network (e.g., Internet 100) to the one or more specified target systems. The information may be delivered according to specified communications information for the specified target systems. The communication of the package from the configuration management service 112 to the target system(s) may be secured, for example using private key/public key encryption or other means of securing communications over a public network. In one embodiment, the security to be used to communicate with a target system may be specified by the client.

Once a package is received on a target system, the package may then be installed. The client may initiate or otherwise control the installation of the configuration, or alternatively the installation of the configuration may be performed automatically by the package. In one embodiment, a package may include a module that, once the package arrives on the target system, runs on the target system to check the current state of the target system in regard to the requested configuration associated with the package. The module may, for example, determine that one or more components needed for the configuration are already present on the target system, or that one or more additional or different components not included in the package are needed for the installation. If a component is already installed on the target system, the package may not re-install the component. If additional or different components are needed, the module may attempt to obtain the needed components for the installation.

Configuration management service 112 may generate a configuration specification according to the configuration request and store the configuration specification in configuration database 122 on data storage 120. Configuration database 122 may include configuration specifications received from multiple clients, and thus may be indexed by client. In one embodiment, the client identifiers may be used to index the configuration specifications. In addition, the configuration specifications may be provided with identifiers used to index and distinguish the particular configuration specification from other configuration specifications requested by particular clients. The stored configuration specifications may be used by the configuration management service 112, for example, to track configurations for clients and to verify installed configurations on target systems upon client request for verification.

Figure 2A:
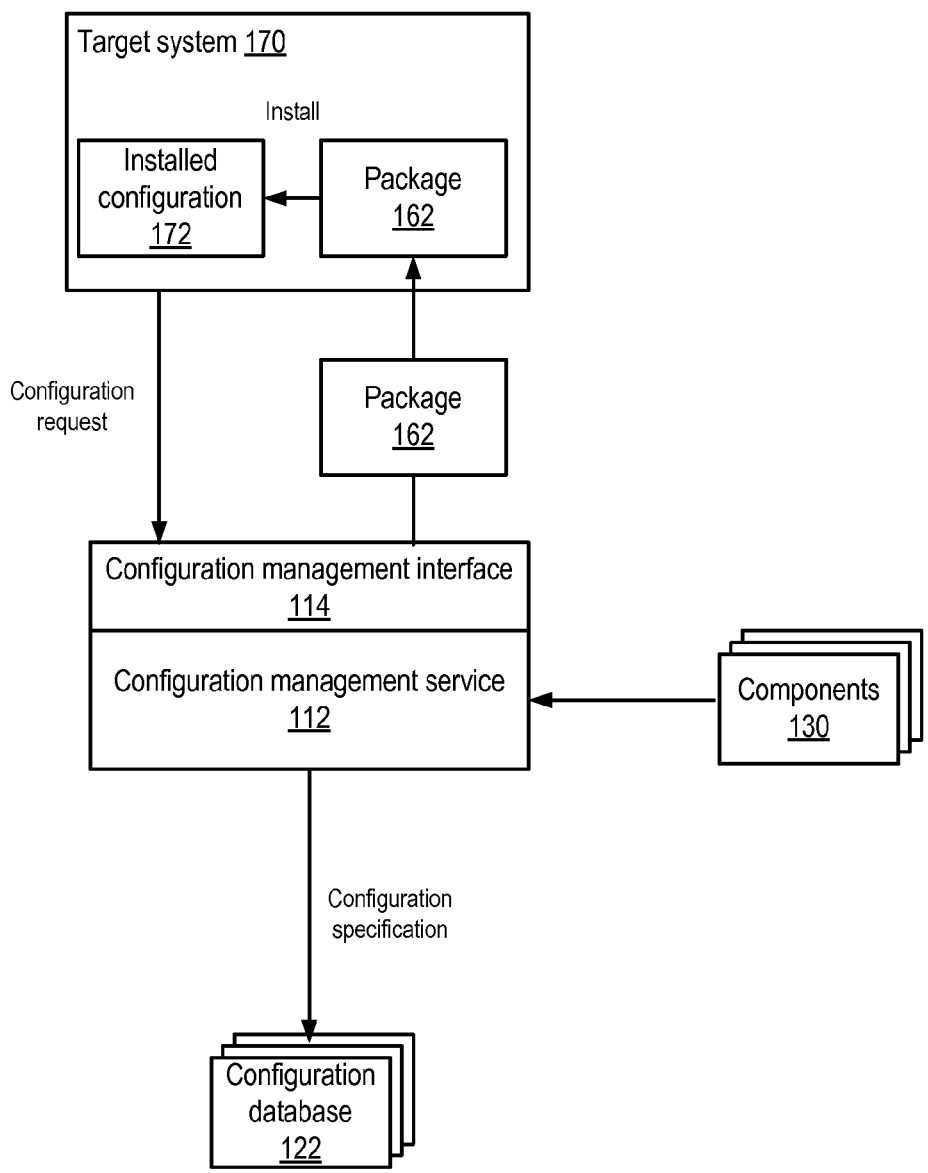
FIGS. 2A through 2C illustrate the generation and delivery of an installation package to a target system and the verification and updating of a previously installed configuration on a target system according to one embodiment.
Figure 2B:
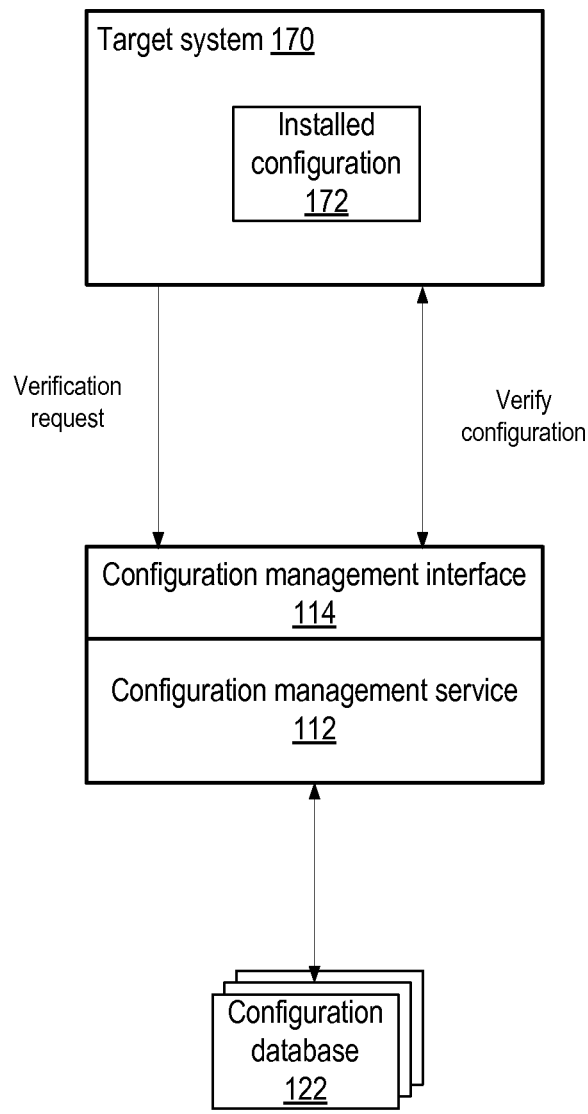
Figure 2C:
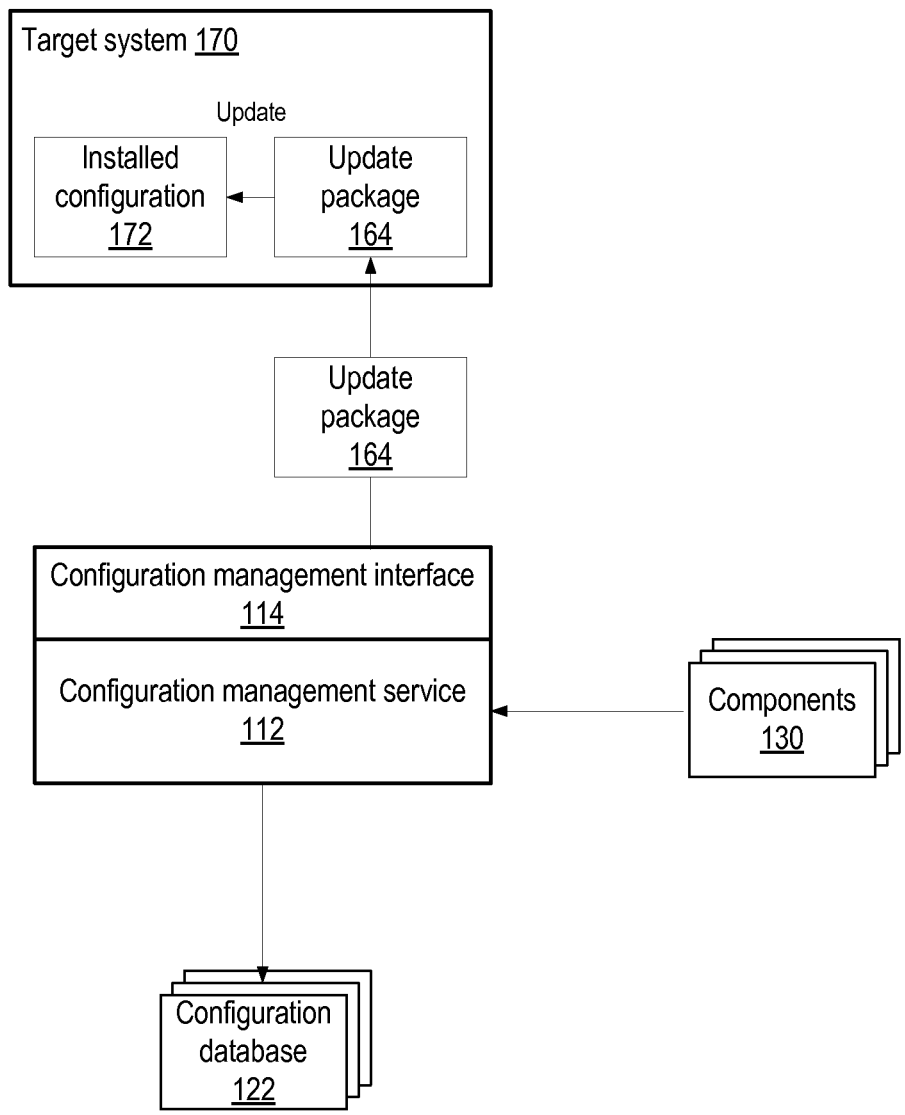

FIGS. 2A through 2C illustrate the generation and delivery of an installation package to a target system and the verification and updating of a previously installed configuration on a target system according to one embodiment. Target system 170 may be a computing device or a virtual machine. In FIG. 2A, a configuration request is generated by a client on target system 170, for example via a browser as illustrated in FIG. 1, though other mechanisms for generating a configuration request may be used. While FIG. 2A shows the configuration request as being generated on target system 170, a configuration request for target system 170 may be generated on some other system. The client may also specify communications information that indicates how the configuration management service 112 is to communicate with the target system(s). In response to receiving the configuration request, configuration management system 112 generates an installation package 162 and sends the package 162 to target system 170. The communication of the package 162 from the configuration management service 112 to the target system 170 may be secured, for example using private key/public key encryption or other means of securing communications over a public network. In one embodiment, the security to be used to communicate with a target system may be specified by the client. The package 162 may subsequently be installed on the target system 170 automatically or alternatively under control of the client. Configuration management service 112 may generate a configuration specification according to the configuration request and store the configuration specification in configuration database 122.

In one embodiment, package 162 may include a module that, once the package arrives on the target system, runs on the target system 170 to check the current state of the target system 170 in regard to the requested configuration associated with the package 162. The module may, for example, determine that one or more components needed for the configuration are already present on the target system 170, or that one or more additional or different components not included in the package 162 are needed for the installation. If a component is already installed on the target system 170, the package may not re-install the component. If additional or different components are needed, the module may attempt to obtain the needed components for the installation. For example, the module may send a message to the configuration management service 112 to request additional or different components. The configuration management service 112 may then generate a new package containing the requested components. Alternatively, the module may attempt to obtain needed components from some other source, for example from a different source via the network or from an installation CD or other storage media associated with the target system 170.

In FIG. 2B, the client may desire to verify the installed configuration 172 on target system 170. For example, one or more components of the installed configuration 172 may have been deleted, moved or damaged, or the client may be concerned that one or more components may be out-of-date. The client may use a browser or some other application on target system 170 to generate a verification request for the installed configuration 172. While FIG. 2B shows the verification request as being generated on target system 170, a verification request for target system 170 may be generated on some other system. The verification request may be a message in accordance with configuration management interface 114. The verification request may include a client identifier that uniquely identifies the client, and also may include an identifier for the particular installed configuration 172 that the client desires to be verified. In one embodiment, a verification request may indicate one or more installed configurations 172 on one or more target systems 170 to be verified. The client may also specify communications information for the specified target system(s).

The verification request may be sent to configuration management service 112 via the network. Upon receiving the verification request via configuration management interface 114, configuration management service 112 may access the corresponding configuration specification in configuration database 122 and perform verification of the installed configuration 172 on target system 170 over the network. If the installed configuration 172 is determined to be correct, configuration management service 112 may notify the client. If the installed configuration 172 is incorrect, configuration management service 112 may correct or update the configuration 172, for example as indicated in FIG. 2C.

In one embodiment, to perform verification of the installed configuration 172 on target system 170 over the network, a software module that is configured to communicate with the configuration management service 112 to verify the installed configuration 172 may be included in the installation package 162 illustrated in FIG. 2A and installed on the target system 170. In response to receiving a verification request from the client, the configuration management service 112 may send one or more messages to the software module that indicate the expected configuration as indicated in configuration database 122. The software module may check the installed configuration 172 on target system 170 to verify the configuration 172 against the expected configuration and reply to the configuration management service 112 to indicate if the installed configuration is correct or incorrect. Alternatively, the module may not be included in the installation package 162, but may instead be sent to the target system 170 in response to the verification request received from the client.

In FIG. 2C, configuration management service 112 has determined that installed configuration 172 on target system 170 is not correct. For example, one or more components may be missing, damaged, or out-of-date, or some change in target system 170 may require that one or more components be added, removed, replaced or modified for compatibility. In one embodiment, configuration management service 112 may generate an update package 164 for delivery to and installation on target system 170. Configuration management service 112 may include one or more components 130 in update package 164. Components included in a package may be provided by the service provider and/or by one or more third parties. The components may be obtained locally or from remote locations, e.g. from other servers or locations on an intranet or on the internet. The update package 164 may then be transmitted to target system 170 via the network. The communication of the package 162 from the configuration management service 112 to the target system 170 may be secured, for example using private key/public key encryption or other means of securing communications over a public network. The update package 164 may subsequently be installed on the target system 170 automatically or alternatively under control of the client to update the previously installed configuration 172. Configuration management service 112 may update the configuration specification stored in configuration database 122, if necessary.

A method similar to that described above in reference to FIGS. 2B and 2C may be used to add or remove components from an installed configuration. The client may generate a configuration change request that specifies component(s) to be added to or removed from an installed configuration 172. The configuration change request may be sent to the configuration management service 112 in accordance with the configuration management interface 114. The configuration management service 112 may generate an update package 164 in accordance with the configuration change request, and may modify the stored configuration specification corresponding to the installed configuration 172 accordingly. The update package 164 may be sent to the target system 170, and installed or run on the target system 170 to effect the requested changes in the installed configuration 172.

Figure 3:
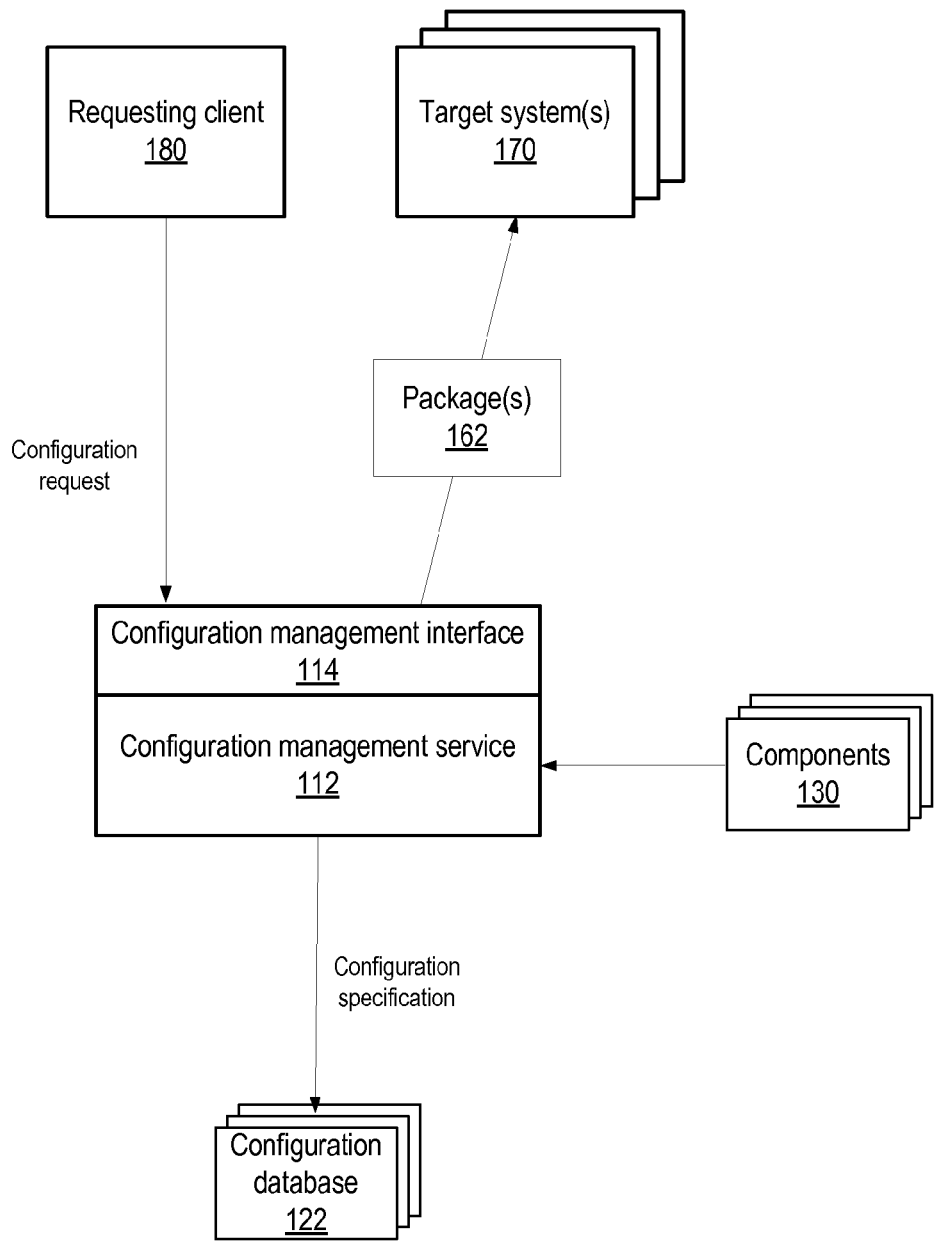
FIG. 3 illustrates the generation and delivery of an installation package to multiple target systems according to one embodiment.

FIG. 3 illustrates the generation and delivery of an installation package to multiple target systems according to one embodiment. A configuration request may be generated by a requesting client 180 on a computer system, for example via a browser as illustrated in FIG. 1, though other mechanisms for generating a configuration request may be used. The configuration request may include a client identifier that uniquely identifies the client, and also may include indications of one or more target systems 170 on which the specified configuration is to be installed. The client may also specify communications information for the specified target system(s). In response to receiving the configuration request, configuration management system 112 generates one or more installation packages 162 and sends the package(s) 162 to target systems 170. The communication of the package(s) 162 from the configuration management service 112 to the target systems 170 may be secured, for example using private key/public key encryption or other means of securing communications over a public network. In one embodiment, the security to be used to communicate with a target system may be specified by the client. The package(s) 162 may subsequently be installed on the target systems 170 automatically or alternatively under control of the client(s). Configuration management service 112 may generate one or more configuration specifications according to the configuration request and store the configuration specification(s) in configuration database 122. The configuration specification(s) may be used, for example, to track and verify the installed configurations on target systems 170.

Figure 4:
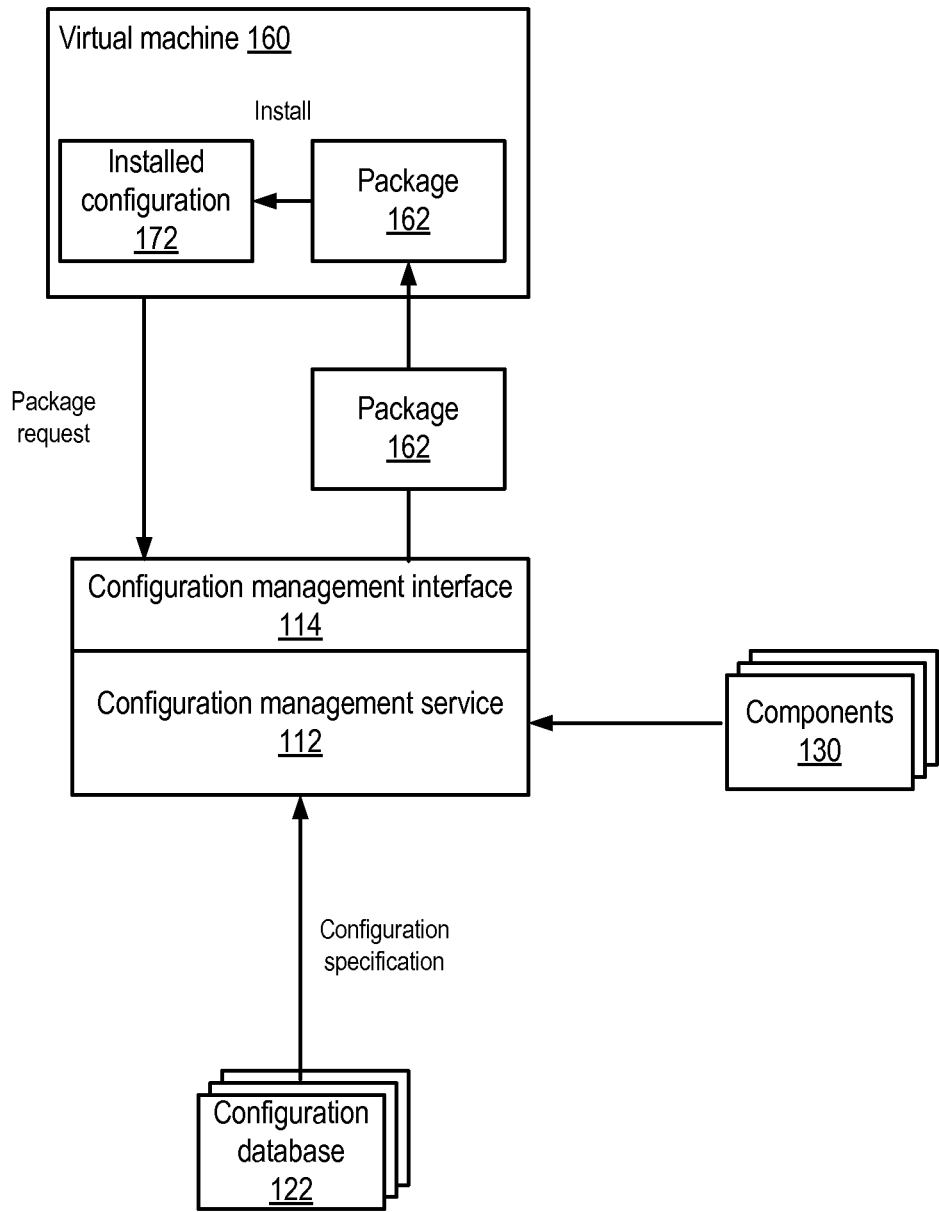
FIG. 4 illustrates the generation and delivery of an installation package to a virtual machine upon startup or initiation of the virtual machine according to one embodiment.

FIG. 4 illustrates the generation and delivery of an installation package to a virtual machine upon startup or initiation of the virtual machine according to one embodiment. A virtual machine 160 generally does not include permanent storage for configurations. Thus, if a virtual machine 160 goes down for some reason, the configuration may be lost. Embodiments of the configuration management service may be used to store configuration information for virtual machines 160 so that specified configurations can be restored upon startup of the virtual machines 160. An exemplary virtual machine 160 to which packages may be delivered may be a virtual machine implemented on a network via a network-based virtual machine service that provides resizable compute and/or storage capacity across one or more computer systems on the network to users as a "virtual machine."

A client may specify a configuration for one or more virtual machines 160 to configuration management service 112, for example via a web page presented via a browser on a computer system. The client may also specify communications information that indicates how the configuration management service is to communicate with the virtual machine environment. The configuration management service 112 may store a configuration specification for the virtual machine(s) 160 to configuration database 122. As part of the initiation process of a virtual machine 160, a package request may be sent to configuration management service 112. For example, a script executed during the initiation process may include a command line that initiates the package request. In response to receiving the package request, configuration management system 112 generates an installation package 162 and sends the package 162 to the virtual machine 160 or to some target system on which at least part of the virtual machine is being implemented. The communication of the package 162 from the configuration management service 112 to the virtual machine 160 may be secured, for example using private key/public key encryption or other means of securing communications over a public network. In one embodiment, the security to be used may be specified by the client. The package 162 may subsequently be installed on the virtual machine automatically or alternatively under direction of the client. The stored configuration specification may be used to verify the installed configuration 172 on the virtual machine 160, for example as described above in reference to FIGS. 2B and 2C.

Figure 5:
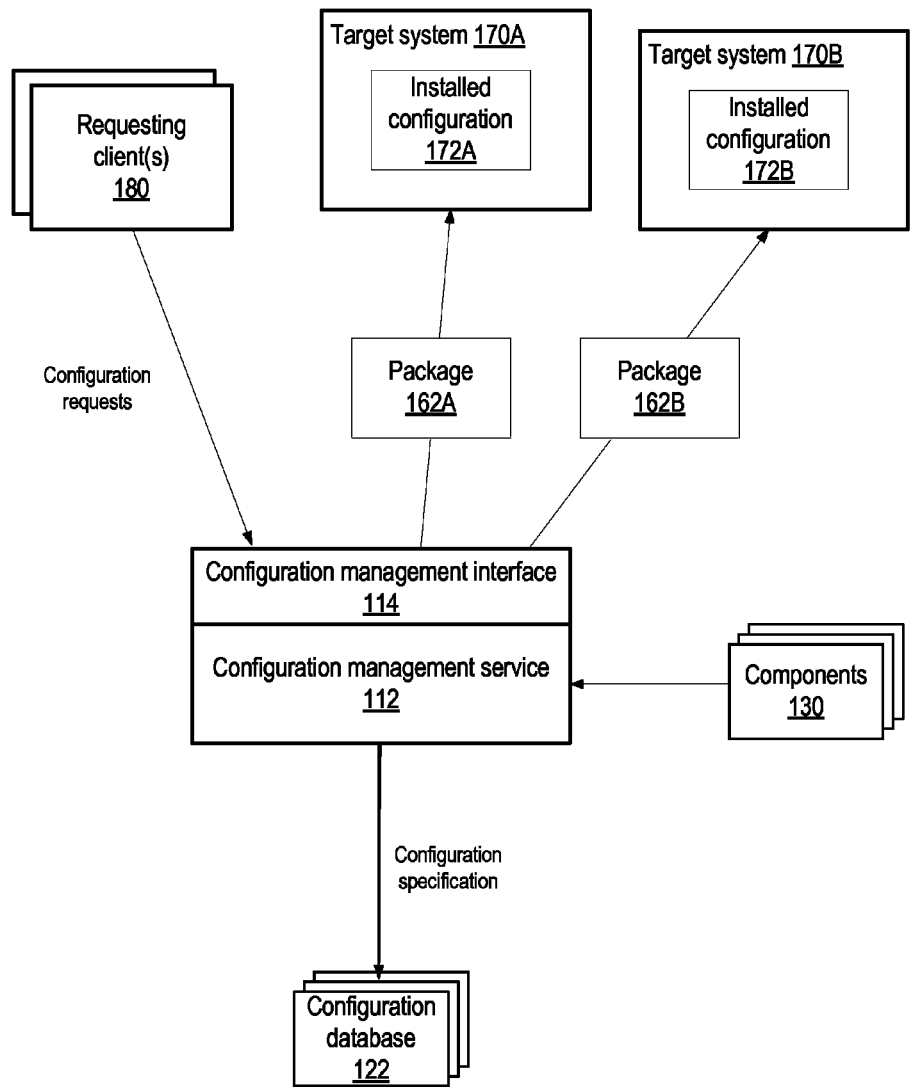
FIG. 5 illustrates the generation and delivery of different installation packages to different target systems according to one embodiment.

FIG. 5 illustrates the generation and delivery of different installation packages to different target systems by a configuration management system according to one embodiment. Configuration management system 112 may be a generic configuration management system configured to build and deliver different packages for installing a variety of different configurations to heterogeneous target systems 170. Two or more different clients 180 may request configurations for two or more target systems 170. The clients may also specify communications information for the target systems 170. The target systems 170 may be heterogeneous. That is, the target systems 170 may be of different types, makes and models, may include different hardware and/or software architectures or environments, and may run different operating systems, storage systems, applications or combinations of applications, application suites such as word processing suites, and so on. As previously noted, a target system 170 may be implemented as a computing device or as a virtual machine.

Configuration management service 112 may be generic and not limited in regards to the types of configurations on target systems that clients may request from configuration management system 112. For each received configuration request, the configuration management service 112 may build a specific package 162 including one or more particular components 130 for implementing the particular configuration indicated by the configuration request on the particular target system 170. For example, package 162A may include one or more components for implementing a requested office application suite or word processing application on target system 170A, and package 162B may include one or more components for implementing a game or game system on target system 170B. As another example, target systems 170A and 170B may implement different hardware platforms and/or software environments; package 162A may include components for implementing an application environment on target system 170A according to its particular requirements, and package 162B may include one or more different components for implementing the same application environment on target system 170B according to its particular requirements. For each received configuration request, the configuration management service 112 may also store a configuration specification to configuration database 122. The configuration specification may be indexed by client identifier, and may further be indexed by an identifier for the particular configuration and/or target system.

Once the packages 162 are built, the configuration management service 112 may deliver the packages 162 to the indicated target systems 170 via a network, which may be, but is not necessarily, the same network or communications channel via which the configuration requests are received. Each package 162 may be delivered to its target system 170 according to particular communications information specified by the client in regard to that target system 170. In this example, package 162A is delivered to target system 170A, and package 162B is delivered to target system 170B. Once a package 162 is received on a target system 170, the package may install, or may be accessed by the client or another user or administrator to install, the particular configuration on the target system 170. In this example, package 162A installs configuration 172A on target system 170A, and package 162B installs configuration 172B on target system 170B.

In one embodiment, a package 162 may include a module that, once the package arrives on the target system, runs on the target system 170 to check the current state of the target system 170 in regard to the requested configuration associated with the package 162. The module may, for example, determine that one or more components needed for the configuration are already present on the target system 170, or that one or more additional or different components not included in the package 162 are needed for the installation. If a component is already installed on the target system 170, the package may not re-install the component. If additional or different components are needed, the module may attempt to obtain the needed components for the installation. For example, the module may send a message to the configuration management service 112 to request additional or different components. The configuration management service 112 may then generate a new package containing the requested components. Alternatively, the module may attempt to obtain needed components from some other source, for example from a different source via the network or from an installation CD or other storage media associated with the target system 170.

Figure 6:
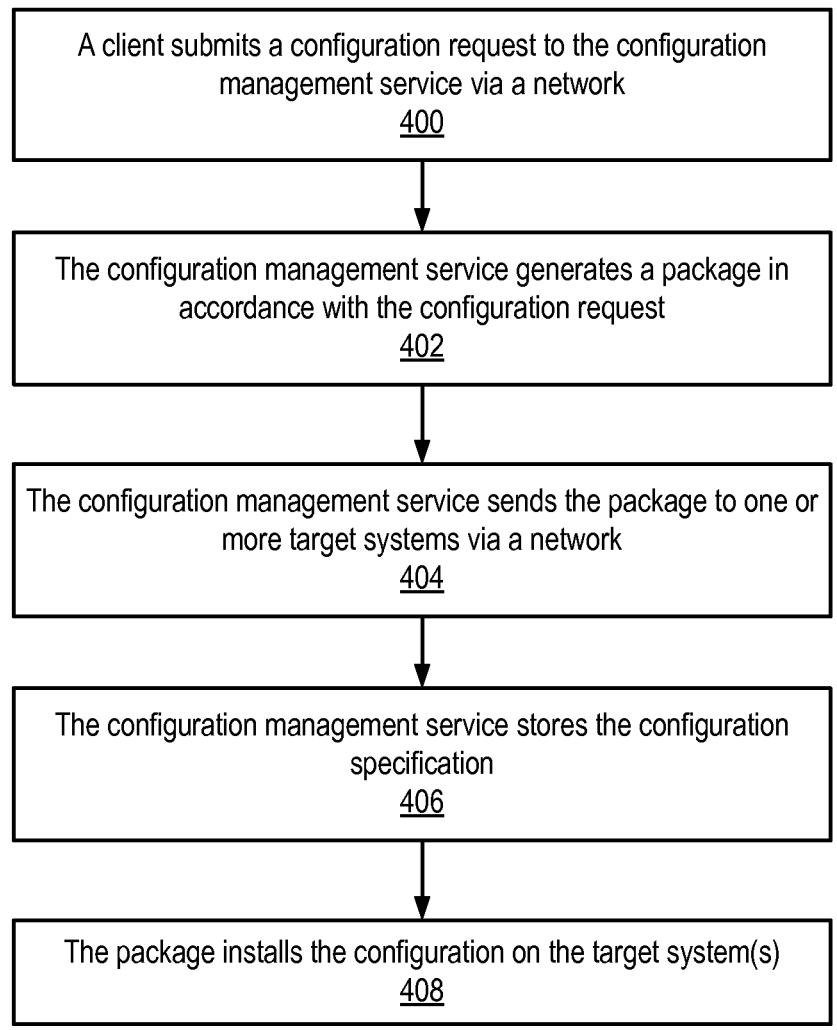
FIG. 6 is a flowchart illustrating a method of specifying a configuration and delivering an installation package to a target system to install the requested configuration, according to one embodiment.

FIG. 6 is a flowchart illustrating a method of specifying a configuration and delivering an installation package to a target system to install the requested configuration, according to one embodiment. As indicated at 400, a client submits a configuration request to the configuration management service via a network. In one embodiment, the client may specify the configuration via an interface on a client computer system, for example via a browser interface. The configuration request may be submitted via the network as a message in accordance with an interface to the configuration management service. In one embodiment, the interface to the configuration management service may be implemented as a web service interface. The configuration request may include indications of one or more target systems for the configuration. The target systems may be computer systems or virtual machines implemented on one or more computer systems. In one embodiment, the configuration request may include a client identifier that uniquely identifies the client of the configuration management system. A target system may be the same system on which the client specifies the configuration or some other system. The client may also specify communications information that indicates how the configuration management service is to communicate with the target system(s).

As indicated at 402, in response to receiving the configuration request via the interface to the configuration management service, the configuration management service generates a package in accordance with the configuration request. The package may include one or more components for implementing the configuration on the target system(s). Components may include software and/or data. In one embodiment, the package or components in the package may be compressed.

As indicated at 404, the configuration management service sends the package to the one or more target systems via the network. In one embodiment, communications information as specified by the client may be used by the configuration management service to communicate with the target system. In one embodiment, bit torrent may be used to distribute the package to the target system(s). In other embodiments, other methods for sending information over the network to target system(s) may be used. In one embodiment, the transmission of the package over the network may be encrypted or otherwise secured for secure communications over a public network. In one embodiment, the security to be used to communicate with a target system may be specified by the client.

As indicated at 406, the configuration management service may store a configuration specification to data storage, for example as an entry or entries in a database. The configuration specifications in the data storage may be indexed by the client identifier. A client may request more than one configuration; therefore, the configuration specifications may be assigned configuration identifiers that are at least unique for the client, and the configuration specifications may be further indexed by the configuration identifiers.

As indicated at 408, once the package is received on a target system, the package may install the configuration on the target system. In one embodiment, the package may be configured to automatically install the configuration on the target system. In one embodiment, the package may install the configuration on the target system under direction of the client or some other user with administrative authority on the client system. In one embodiment, a package may include a module that, once the package arrives on the target system, runs on the target system to check the current state of the target system in regard to the requested configuration associated with the package. The module may, for example, determine that one or more components needed for the configuration are already present on the target system, or that one or more additional or different components not included in the package are needed for the installation. If a component is already installed on the target system, the package may not re-install the component. If additional or different components are needed, the module may attempt to obtain the needed components for the installation, for example, the module may send a message to the configuration management service to request additional or different components.

As noted above, in one embodiment, the target system(s) may be virtual machines. A client may use embodiments of the configuration management service to initially specify one or more configurations for installation on the virtual machine(s) to the configuration management service in accordance with the interface to the configuration management service. The configuration management service may store configuration specifications for the virtual machines according to the client's specifications. When one of the client's specified virtual machines subsequently starts up, a package request may be automatically generated and sent to the configuration management service for the virtual machine in accordance with the interface to the configuration management service. Upon receiving the package request, the configuration management service may generate a package according to the stored configuration specification for the virtual machine and send the package to the virtual machine for installation.

Figure 7:
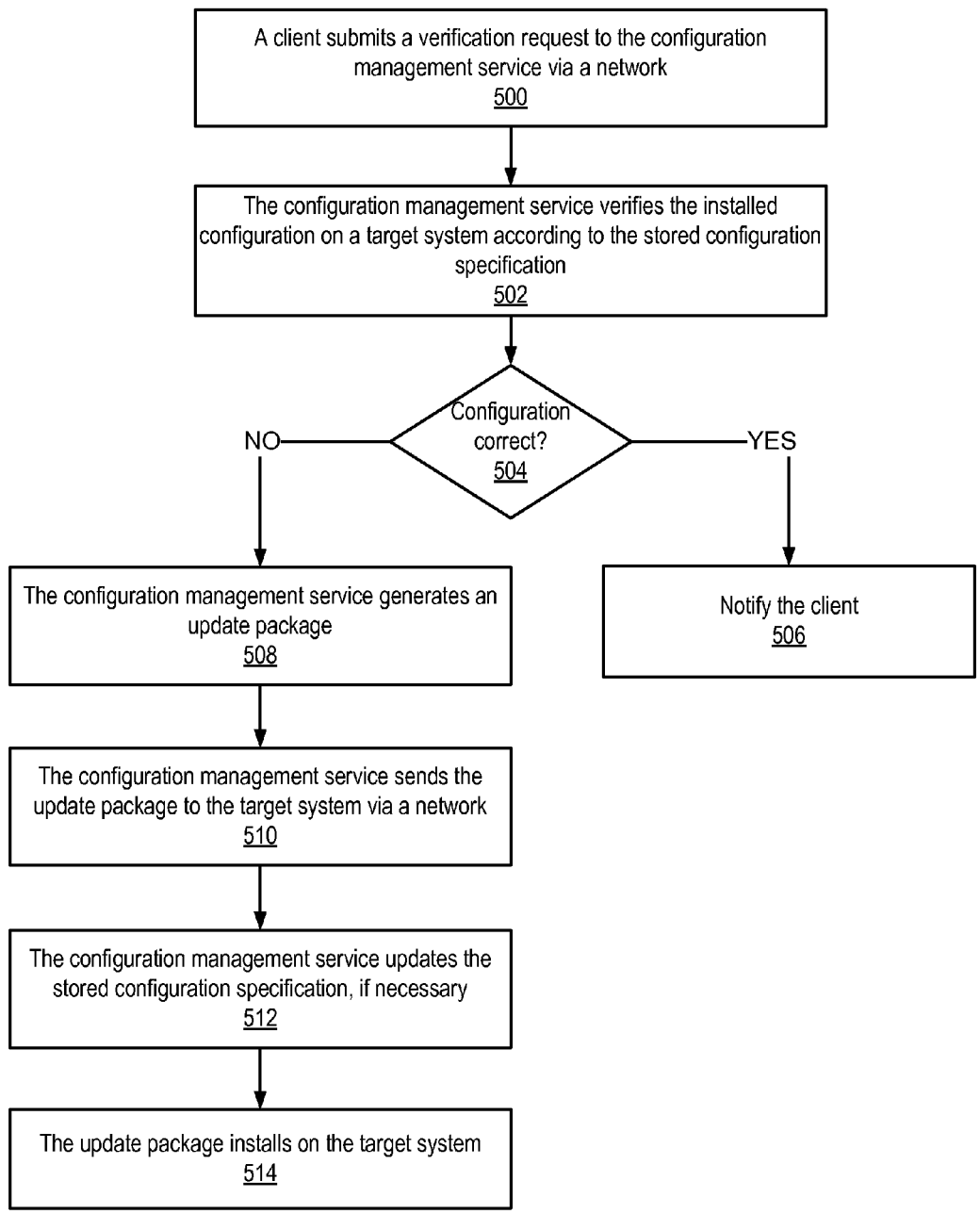
FIG. 7 is a flowchart illustrating a method of verifying an installed configuration, according to one embodiment.

FIG. 7 is a flowchart illustrating a method of verifying an installed configuration, according to one embodiment. Note that the verification is "agentless"; that is, the verification is initiated by a client and not by an agent or daemon running on a client system. As indicated at 500, a client may submit a configuration verification request to the configuration management service via a network. For example, one or more components of an installed configuration may have been deleted, moved or damaged, or the client may be concerned that one or more components may be out-of-date. In one embodiment, the client may submit the configuration verification request via an interface on a client computer system, for example via a browser interface. The configuration verification request may be submitted via the network as a web service message in accordance with an interface to the configuration management service. In one embodiment, the interface may be implemented as a web service interface. The configuration verification request may include indications of one or more target systems to be verified. The target systems may be computer systems or virtual machines implemented on one or more computer systems. In one embodiment, the configuration verification request may include a client identifier that uniquely identifies the client of the configuration management system. In one embodiment, the configuration verification request may include a configuration identifier that identifies the configuration to be verified. The client may also specify communications information that indicates how the configuration management service is to communicate with the target system(s).

As indicated at 502, in response to receiving the configuration verification request, the configuration management service may verify the specified installed configuration on a target system according to the stored configuration specification corresponding to the installed configuration. Upon receiving the request via the interface, the configuration management service may access the corresponding configuration specification from a configuration database and perform verification of the installed configuration on the target system over the network. In one embodiment, communications information as specified by the client may be used by the configuration management service to communicate with the target system. In one embodiment, to perform verification of the installed configuration on the target system over the network, a software module that is configured to communicate with the configuration management service to verify the installed configuration may be included in the installation package. In response to receiving a verification request from the client, the configuration management service may send one or more messages to the software module that indicate the expected configuration as indicated in configuration database. The software module may check the installed configuration on the target system to verify the configuration against the expected configuration and reply to the configuration management service to indicate if the installed configuration is correct or incorrect. Alternatively, the module may not be included in the installation package, but may instead be sent to the target system in response to the verification request received from the client. In one embodiment, a module or program to which the configuration management service is to communicate may be provided by the client, and may be specified to the configuration management service as part of the communications information. Other methods of verifying the configuration over the network may be used in other embodiments.

At 504, if the configuration is correct, the client may be notified, as indicated at 506. If the configuration is not correct, in one embodiment, the configuration management service may generate an update package, as indicated at 508. In one embodiment, the update package may be automatically generated upon determining that the installed configuration is incorrect. In one embodiment, an update package is generated upon receiving approval by the client. In this embodiment, the client may be notified that the configuration is incorrect, and asked if the client wants an update package to be generated and sent to the target system to correct the installed configuration. The update package may include one or more components for correcting the configuration on the target system. Components may include software and/or data. In one embodiment, the update package or components in the package may be compressed.

As indicated at 510, the configuration management service sends the update package to the target system via the network. In one embodiment, bit torrent may be used to send the update package to the target system. In other embodiments, other methods for sending information over the network to target system(s) may be used. In one embodiment, the transmission of the update package over the network may be encrypted or otherwise secured for secure communications over a public network.

As indicated at 512, the configuration management service updates the stored configuration specification, if necessary. For example, verification of the installed configuration may discover that one or more components necessary for the configuration and included in the update package are not indicated in the stored configuration specification. As another example, verification of the installed configuration may discover that one or more components of the package are old versions of available components, and therefore the update package may include newer versions of the components and the configuration specification may be updated accordingly.

As indicated at 514, the update package may be installed on the target system. In one embodiment, the package may be configured to automatically update or correct the configuration on the target system. In one embodiment, the package may update or correct the configuration on the target system under direction of the client or some other user with administrative authority on the client system.

A method similar to that described above in reference to FIG. 7 may be used to add components to or remove components from an installed configuration. The client may generate a configuration change request that specifies component(s) to be added or removed from the configuration. The configuration change request may be sent to the configuration management service in accordance with the web services interface. The configuration management service may generate an update package in accordance with the configuration change request, and may modify the stored configuration specification accordingly. The update package may be sent to the specified target system(s), and installed or run on the target system(s) to effect the requested changes in the installed configuration(s).

As noted above, in one embodiment, the target system(s) may be virtual machines. A client may use embodiments of the configuration management service to initially specify one or more configurations for installation on the virtual machine(s) to the configuration management service in accordance with the interface to the configuration management service. The configuration management service may store configuration specifications for the virtual machines according to the client's specifications. When the client's specified virtual machines subsequently start up, package requests may be automatically generated and sent to the configuration management service for the virtual machines in accordance with the interface to the configuration management service. Upon receiving the package request, the configuration management service may generate package according to the stored configuration specifications for the virtual machines and send the package to the virtual machines for installation. In this embodiment, the client may generate a verification request to verify installed packages on one or more of the virtual machines.

Illustrative System

In one embodiment, a web server that implements a configuration management service as described herein may include a general-purpose computer system that includes or is configured to access one or more computer-accessible media, such as computer system 900 illustrated in FIG. 8. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a configuration management service, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems or communications devices as illustrated in FIG. 3, for example. In particular, network interface 940 may be configured to allow communication between computer system 900 and client systems 810 through various communications channels via network(s) 800. These client systems 810 may include both client computer systems and virtual machines, and may include what has been described herein as "target systems" and client systems from which clients may specify configurations and request configuration verifications. A client system 810 may be both; that is, a client system may be both a target system and the system from which the client specifies a configuration or requests a configuration verification. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 7 for implementing a configuration management service. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   at least one processor;
   a memory comprising program instructions, wherein the program instructions are executable by the processor to implement a configuration management service configured to:
   receive via a network, from a plurality of clients of the configuration management service, a plurality of configuration requests in accordance with a standard network interface to the configuration management service, wherein individual ones of the plurality of configuration requests indicate one or more target systems, and specifies a configuration for the indicated one or more target systems, and wherein at least one of the plurality of configuration requests from one of the plurality of clients specifies a configuration for a different type of application environment or software execution environment than does another one of the plurality of configuration requests from another one of the plurality of clients; and
   in response to individual received configuration requests:
   for one or more target systems indicated by the configuration request, determine one or more components for implementing the configuration specified by the configuration request on the respective target system;
   generate one or more packages comprising the determined one or more components for implementing the configuration specified by the configuration request on at least one of the target systems indicated by the configuration request; and
   send the one or more packages to a respective at least one of the one or more target systems indicated by the configuration request via the network;
   wherein the packages sent to respective target systems in response to the plurality of configuration requests include at least two packages comprising different components specific to a respective different type of application environment or software execution environment in accordance with the configurations specified by the respective configuration requests;

receive via the network, from one of the plurality of clients of the configuration management service, a configuration verification request that specifies an installed configuration on a target system to be verified;

determine, in response to the configuration verification request, that the installed configuration on the target system is not correct by comparing, via the network, the installed configuration on the target system to a locally stored configuration specification corresponding to the installed configuration on the target system; and in response to said determining that the installed configuration on the target system is not correct:
generate an update package comprising one or more components for correcting the installed configuration on the target system; and
send the update package to the target system via the network.

2. The system as recited in claim 1, wherein at least one of the plurality of configuration requests indicates two or more target systems implemented according to different platforms, wherein a separate package is generated for each of the two or more target systems according to the respective platform, each of the separate packages including at least one component specific to implementing the configuration specified by the respective configuration request on the respective target system.

3. The system as recited in claim 1, wherein the system further comprises a data storage, and wherein the configuration management service is further configured to store configuration specifications to the data storage, wherein the configuration specifications comprise information indicating the specified configurations.

4. The system as recited in claim 1, wherein each package is configured to install the specified configuration on a respective target system after the package is received on the respective target system.

5. The system as recited in claim 1, wherein each package is configured to:
determine that the respective target system does not include one or more components necessary to install the specified configuration; and
obtain the missing components for installation on the respective target system.

6. The system as recited in claim 5, wherein the package is configured to obtain the missing components from the configuration management service.

7. The system as recited in claim 1, wherein each configuration request includes a client identifier that uniquely identifies a client of the configuration management service that initiated the configuration request.

8. The system as recited in claim 7, wherein the system further comprises a data storage, wherein the configuration management service is further configured to store configuration specifications to the data storage, wherein the configuration specifications comprise information indicating the specified configurations, and wherein the stored configuration specifications are indexed according to the client identifiers.

9. The system as recited in claim 1, wherein each package is encrypted for secure transmission over the network to the one or more target systems.

10. The system as recited in claim 1, wherein at least one of the one or more target systems is a virtual machine, wherein a virtual machine is a virtual, non-physical computing environment created within a host environment, wherein the host environment comprises one or more computing systems.

11. The system as recited in claim 1, wherein the configuration management service is implemented as a web service, and wherein the standard network interface is a web service interface.

12. A system, comprising:
a server computer system configured to couple to a network, wherein the server computer system is configured to implement a configuration management service configured to:
receive via the network, from a plurality of clients of the configuration management service, a plurality of configuration requests in accordance with a standard network interface to the configuration management service, wherein individual ones of the plurality of configuration requests specify a configuration for one or more virtual machines, wherein a virtual machine is a virtual, non-physical computing environment created within a host environment, wherein the host environment comprises one or more computing systems, and wherein at least one of the plurality of configuration requests from one of the plurality of clients specifies a configuration for a different type of application environment or software execution environment than does another one of the plurality of configuration requests from another one of the plurality of clients;
in response to individual received configuration requests, store a configuration specification that specifies one or more components of the respective configuration, wherein at least one of the stored configuration specifications specifies one or more components of a configuration for a different type of application environment or software execution environment than does another one of the stored configuration specifications;
receive, from individual ones of two or more virtual machines during initiation of the respective virtual machine, at least one package request in accordance with the standard network interface;
in response to the at least one package request:
determine one of the stored configuration specifications as the configuration specification for the respective virtual machine;
generate a package comprising the one or more components of the configuration as specified by the determined configuration specification, wherein the package is configured to implement the configuration on the respective virtual machine during or after initiation of the virtual machine; and
send the package to the respective virtual machine via a network,
wherein the packages sent to the respective virtual machines in response to the package requests include at least two packages comprising different components specific to a respective different type of application environment or software execution environment in accordance with the configurations specified by the respective configuration requests;
receive via the network, from one of the plurality of clients of the configuration management service, a configuration verification request that specifies an installed configuration on a virtual machine to be verified;

determine, in response to the configuration verification request, that the installed configuration on the virtual machine is not correct by comparing, via the network, the installed configuration on the virtual machine to a locally stored configuration specification corresponding to the installed configuration on the virtual machine; and in response to said determining that the installed configuration on the virtual machine is not correct:

generate an update package comprising one or more components for correcting the installed configuration on the virtual machine; and send the update package to the virtual machine via the network.

13. The system as recited in claim 12, wherein each package is configured to install the one or more components of the configuration on the virtual machine after the package is received on the virtual machine.

14. A computer-implemented method, comprising:

receiving, by a configuration management service implemented on one or more computing devices via a network, a plurality of configuration requests from a plurality of clients of the configuration management service in accordance with a standard network interface to the configuration management service, wherein individual ones of the plurality of configuration requests indicate one or more target systems and specifies configuration for the indicated one or more target systems indicated by the configuration request, wherein the individual ones of the plurality of configuration requests are received via the network from a client device of a respective one of the plurality of clients, wherein the respective client specifies implementation of the particular configuration specified by the configuration request via the client device, and wherein at least one of the plurality of configuration requests from one of the plurality of clients specifies a configuration for a different type of application environment or software execution environment than does another one of the plurality of configuration requests from another one of the plurality of clients; and in response to individual received configuration requests:

for one or more target systems indicated by the configuration request, determining one or more components for implementing the configuration specified by the configuration request on the respective target system;

generating one or more packages comprising the determined one or more components for implementing the configuration specified by the configuration request on at least one of the target systems indicated by the configuration request; and sending the one or more packages to respective at least one of the one or more target systems indicated by the configuration request via the network, wherein the packages sent to respective target systems in response to the plurality of configuration requests include at least two packages comprising different components specific to a respective different type of application environment or software execution environment in accordance with the configurations specified by the respective configuration requests;

receiving by the configuration management service via the network, from one of the plurality of clients of the configuration management service, a configuration verification request that specifies an installed configuration on a target system to be verified;

determining, in response to the configuration verification request, that the installed configuration on the target system is not correct by comparing, via the network, the installed configuration on the target system to a locally stored configuration specification corresponding to the installed configuration on the target system;

in response to said determining that the installed configuration on the target system is not correct:

generating an update package comprising one or more components for correcting the installed configuration on the target system; and sending the update package to the target system via the network.

15. The method as recited in claim 14, further comprising storing configuration specifications comprising information indicating the specified configurations to a data storage.

16. The method as recited in claim 14, further comprising each package installing the specified configuration on a respective target system after the package is received on the respective target system.

17. The method as recited in claim 14, further comprising performing, by each package on a respective target system:

determining that the respective target system does not include one or more components necessary to install the specified configuration; and obtaining the missing components from the configuration management service for installation on the respective target system.

18. The method as recited in claim 14, wherein at least one of the one or more target systems is a virtual machine, wherein a virtual machine is a virtual, non-physical computing environment created within a host environment, wherein the host environment comprises one or more computing systems.

19. The method as recited in claim 14, wherein the configuration management service is implemented as a web service, and wherein the standard network interface is a web service interface.

20. A non-transitory computer-accessible storage medium, comprising program instructions, wherein the program instructions are computer-executable to implement a configuration management service configured to:

receive via a network, from a plurality of clients of the configuration management service, a plurality of configuration requests in accordance with a standard network interface to the configuration management service, wherein individual ones of the plurality of configuration requests indicate one or more target systems and specifies a configuration for the indicated one or more target systems and wherein at least one of the plurality of configuration requests from one of the plurality of clients specifies a configuration for a different type of application environment or software execution environment than does another one of the plurality of configuration requests from another one of the plurality of clients; and in response to individual received configuration requests:

for one or more target systems indicated by the configuration request, determine one or more components for implementing the configuration specified by the configuration request on the respective target system;

generate one or more packages comprising the determined one or more components for implementing the configuration specified by the configuration request on at least one of the target systems indicated by the configuration request; and send the one or more packages to a respective at least one of the one or more target systems indicated by the configuration request via the network;

wherein the packages sent to respective target systems in response to the plurality of configuration requests include at least two packages comprising different components that are specific to a respective different type of application environment or software execution environment in accordance with the configurations specified by the respective configuration requests;

receive via the network, from one of the plurality of clients of the configuration management service, a configuration verification request that specifies an installed configuration on a target system to be verified;

determine, in response to the configuration verification request, that the installed configuration on the target system is not correct by comparing, via the network, the installed configuration on the target system to a locally stored configuration specification corresponding to the installed configuration on the target system;

in response to said determining that the installed configuration on the target system is not correct:

generate an update package comprising one or more components for correcting the installed configuration on the target system; and send the update package to the target system via the network.

21. The non-transitory computer-accessible storage medium as recited in claim 20, wherein each package is configured to install the specified configuration on a respective target system after the package is received on the respective target system.

22. The non-transitory computer-accessible storage medium as recited in claim 20, wherein the configuration management service is further configured to store configuration specifications comprising information indicating the specified configurations to data storage, and wherein the stored configuration specifications are indexed according to client identifiers that uniquely identify the clients of the configuration management service.

23. The non-transitory computer-accessible storage medium as recited in claim 20, wherein at least one of the one or more target systems is a virtual machine, wherein a virtual machine is a virtual, non-physical computing environment created within a host environment, wherein the host environment comprises one or more computing systems.

24. The non-transitory computer-accessible storage medium as recited in claim 20, wherein the configuration management service is implemented as a web service, and wherein the standard network interface is a web service interface.

* * * * *